United States Patent
Shinoda et al.

(10) Patent No.: US 12,013,575 B2
(45) Date of Patent: Jun. 18, 2024

(54) OPTICAL CONNECTOR

(71) Applicant: Fujikura Ltd., Tokyo (JP)

(72) Inventors: Tomoyuki Shinoda, Sakura (JP); Shuhei Kanno, Sakura (JP); Takahito Otomitsu, Sakura (JP)

(73) Assignee: Fujikura Ltd., Tokyo (JP)

( * ) Notice: Subject to any disclaimer, the term of this patent is extended or adjusted under 35 U.S.C. 154(b) by 413 days.

(21) Appl. No.: 17/615,818

(22) PCT Filed: Aug. 5, 2020

(86) PCT No.: PCT/JP2020/030039
§ 371 (c)(1),
(2) Date: Dec. 1, 2021

(87) PCT Pub. No.: WO2021/065195
PCT Pub. Date: Apr. 8, 2021

(65) Prior Publication Data
US 2022/0326449 A1 Oct. 13, 2022

(30) Foreign Application Priority Data
Oct. 3, 2019 (JP) ................................. 2019-182990

(51) Int. Cl.
*G02B 6/38* (2006.01)
(52) U.S. Cl.
CPC ........... *G02B 6/3821* (2013.01); *G02B 6/387* (2013.01)
(58) Field of Classification Search
CPC ...................................................... G02B 6/38
(Continued)

(56) References Cited

U.S. PATENT DOCUMENTS 11,822,133 B2 * 11/2023 Chang ................. G02B 6/3885
2006/0153504 A1 * 7/2006 Suzuki ................. G02B 6/389
385/55

(Continued)

FOREIGN PATENT DOCUMENTS

CN 102346279 A 2/2012
CN 202453542 U 9/2012

(Continued)

OTHER PUBLICATIONS

English Translation of International Search Report issued in corresponding International Application No. PCT/JP2020/030039 dated Oct. 6, 2020 (2 pages).

*Primary Examiner* — Kaveh C Kianni
(74) *Attorney, Agent, or Firm* — Osha Bergman Watanabe & Burton LLP (57) ABSTRACT

An optical connector includes: an optical fiber; a ferrule with an insertion hole that accommodates the optical fiber; a housing that accommodates the ferrule and that includes two lock holes formed therein; two springs that sandwich the optical fiber therebetween, and that bias the ferrule in a forward direction of the optical connector; and a support portion that supports the two springs from a rear direction of the optical connector. The support portion includes a first divided member that is combined with a second divided member and two latch portions locked in the two lock holes. When the insertion hole extends is the front and the rear directions, the two springs are disposed along left and right directions of the optical connector, and a vertical direction is orthogonal to the front, rear, right, and left directions, the two latch portions are disposed side by side in the vertical direction.

5 Claims, 7 Drawing Sheets

(58) Field of Classification Search
USPC .......................................................... 385/78
See application file for complete search history.

(56) References Cited

U.S. PATENT DOCUMENTS

| | | | |
|---|---|---|---|
| 2012/0213484 A1 | 8/2012 | Childers et al. | |
| 2013/0071070 A1 | 3/2013 | Song et al. | |
| 2014/0044396 A1* | 2/2014 | Wakjira | G02B 6/38 |
| | | | 385/77 |
| 2016/0246021 A1* | 8/2016 | Otte | G02B 6/4292 |
| 2017/0205588 A1* | 7/2017 | Lee | G02B 6/3878 |
| 2017/0227719 A1* | 8/2017 | Zimmel | G02B 6/3879 |
| 2019/0094460 A1 | 3/2019 | Brusberg et al. | |
| 2019/0377138 A1* | 12/2019 | Wong | G02B 6/3885 |
| 2020/0284998 A1* | 9/2020 | Higley | G02B 6/3898 |
| 2020/0310041 A1* | 10/2020 | Chang | G02B 6/3893 |

FOREIGN PATENT DOCUMENTS

| | | | | |
|---|---|---|---|---|
| JP | 3154119 B2 * | 4/2001 | | G02B 6/38 |
| JP | 2008-122728 A | 5/2008 | | |
| JP | 2010-049147 A | 3/2010 | | |
| JP | 2011-112749 A | 6/2011 | | |
| JP | 4857192 B2 | 1/2012 | | |
| JP | 2019-113740 A | 7/2019 | | |
| WO | 2011/087077 A1 | 7/2011 | | |

* cited by examiner

OPTICAL CONNECTOR

CROSS-REFERENCE TO RELATED APPLICATIONS

This is a national stage of International Patent Application No. PCT/JP2020/030039, filed on Aug. 5, 2020, and claims priority to Japanese Patent Application No. 2019-182990, filed on Oct. 3, 2019. The content of these applications are incorporated herein by reference.

TECHNICAL FIELD

The present invention relates to an optical connector.

BACKGROUND

Patent Document 1 discloses an optical connector including an optical fiber and a ferrule having an insertion hole through which the optical fiber is inserted. A spring is arranged behind the ferrule so as to surround the optical fiber, and the ferrule is biased forward by the spring.

PATENT DOCUMENT

[Patent Document 1] Japanese Patent No. 4857192

In such a kind of optical connector, two springs that bias the ferrule may be arranged so as to sandwich the optical fiber. In such a configuration, when the user operates the optical connector, the spring may fall toward the optical fiber, which may apply local stress to the optical fiber. When local stress is applied to the optical fiber, it may lead to an increase in transmission loss or disconnection of the optical fiber.

SUMMARY

One or more embodiments of the present invention provides an optical connector capable of suppressing the application of local stress to an optical fiber.

The optical connector according to one or more embodiments of the present invention includes an optical fiber, a ferrule having an insertion hole through which the optical fiber is inserted, a housing accommodating the ferrule, and having at least two lock holes formed therein, two springs arranged so as to sandwich the optical fiber therebetween, and biasing the ferrule forward, and a support portion supporting the two springs from a rear, in which the support portion is configured such that a first divided member and a second divided member are combined, and comprises at least two latch portions locked in the two lock holes, and when a direction in which the insertion hole extends is a front and rear direction, a direction in which the two springs are arranged is a left and right direction, and a direction orthogonal to both the front and rear direction and the left and right direction is a vertical direction, the two latch portions are arranged side by side in the vertical direction and are configured to bend in the vertical direction when locked in the two lock holes.

According to the above-described aspect, two latch portions for locking the support portion in the housing are arranged side by side in the vertical direction orthogonal to the left and right direction in which the two springs are arranged side by side. In addition, the two latch portions are configured to bend in the vertical direction. Therefore, even when the two latch portions are pushed toward the inside of the housing during manufacturing or use of the optical connector, the spring is suppressed from being pushed toward the optical fiber by being pushed by the latch portion. Therefore, it is possible to suppress the application of local stress to the optical fiber.

Here, the boundary between the first divided member and the second divided member may be located at a portion other than the two latch portions.

In addition, the support portion may have two positioning portions that each determines the positions of each of the two springs, and the boundary between the first divided member and the second divided member may be located at a portion other than the two positioning portions.

The first divided member and the second divided member may also have the same shape as each other.

In addition, the first divided member may include a first contact surface, the second divided member may include a second contact surface that contacts the first contact surface, and the first contact surface and the second contact surface may face the vertical direction.

According to one or more embodiments of the present invention, it is possible to provide an optical connector capable of suppressing the application of local stress to the optical fiber.

DETAILED DESCRIPTION

Hereinafter, the optical connector according to one or more embodiments will be described with reference to the drawings.

Figure 1:
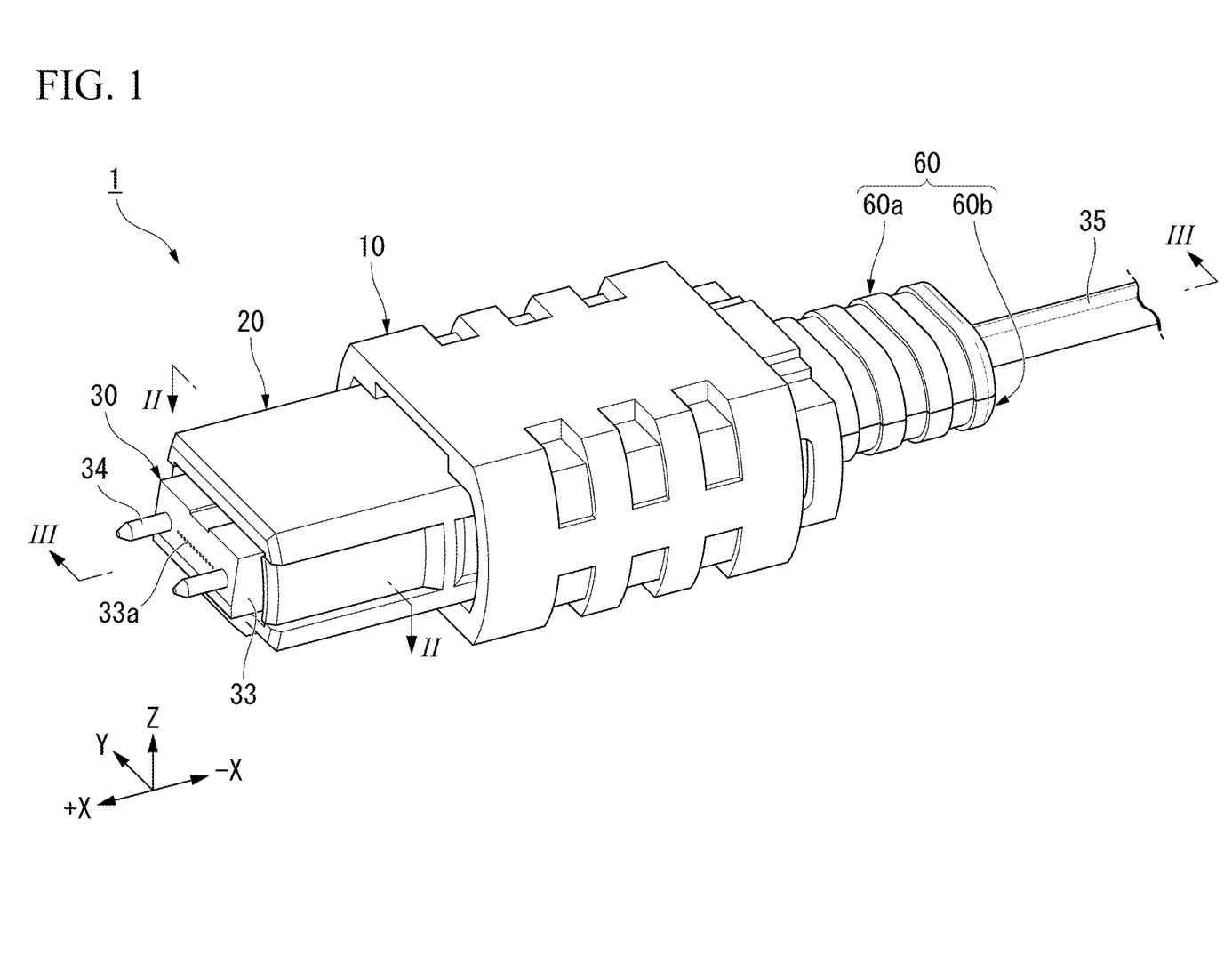
FIG. 1 is a perspective view of an optical connector according to one or more embodiments.
Figure 2:
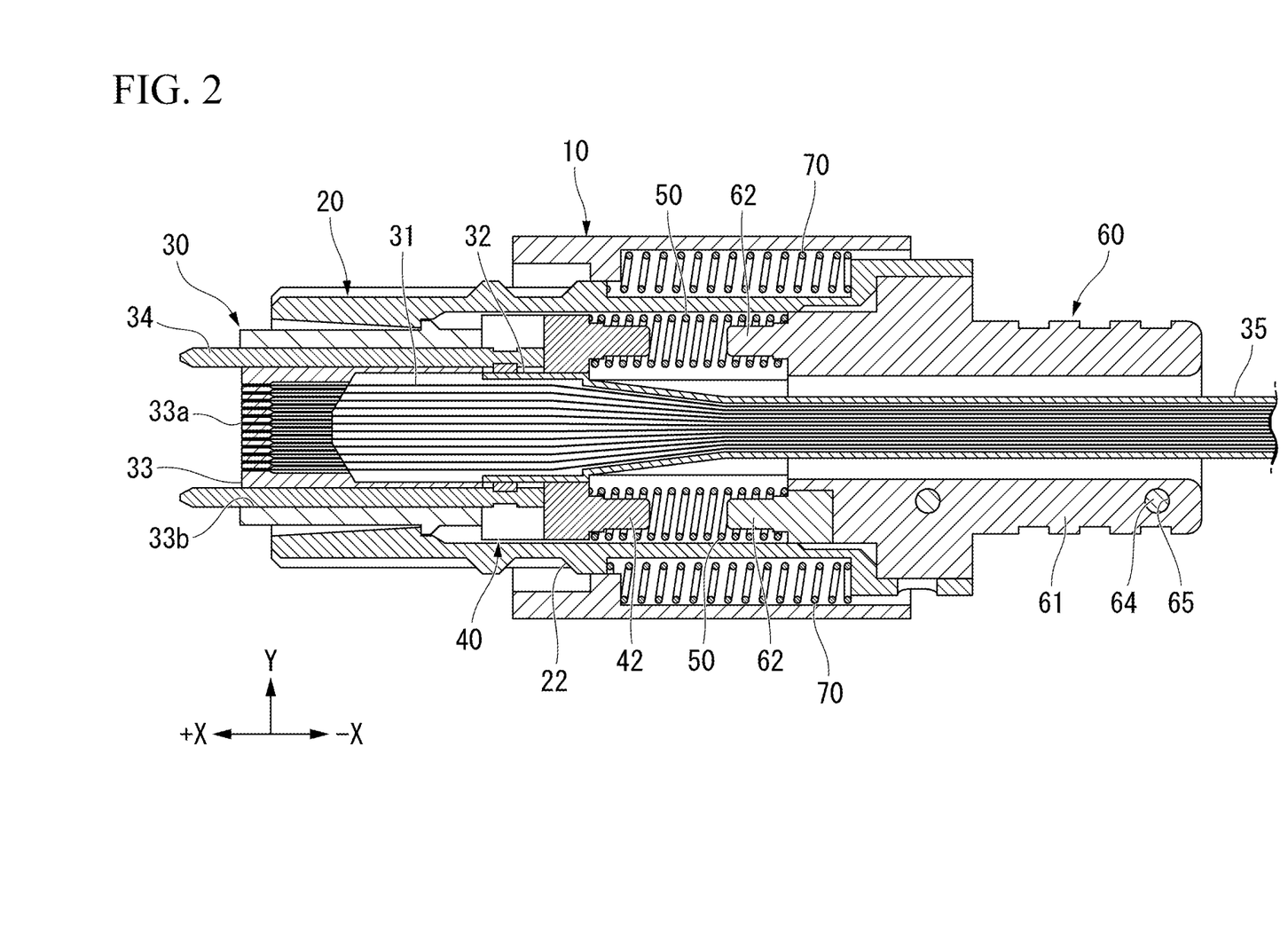
FIG. 2 is a cross-sectional arrow view taken along the II-II line in FIG. 1.

As shown in FIGS. 1 and 2, an optical connector 1 includes a pull-out member 10, a housing 20, a ferrule 33, a spacer 40, two springs 50, a support portion 60, and two second springs 70. A plurality of insertion holes 33*a* are formed in the ferrule 33, and an optical fiber 31 is inserted into each of the insertion holes 33*a*. The portion of the optical fiber 31 extending rearward from the ferrule 33 is covered with a boot 32 and a tube 35. The number of insertion holes 33*a* and the number of optical fibers 31 can be changed as appropriate, and may be one, for example.

(Definition of Direction)

In one or more embodiments, the direction in which the plurality of insertion holes 33*a* extend is referred to as the front and rear direction X, and the direction in which the two springs 50 are arranged side by side is referred to as the left and right direction Y. In addition, the direction orthogonal to both the front and rear direction X and the left and right direction Y is referred to as the vertical direction Z. One side (+X side) in the front and rear direction X is referred to as the front, and the other side (−X side) is referred to as the rear. The left and right direction Y is also the direction in which the plurality of insertion holes 33a are arranged side by side.

The pull-out member 10 is formed in a tubular shape extending in the front and rear direction X, and surrounds the housing 20 from the outside. The pull-out member 10 is biased forward by two second springs 70. Although detailed description will be omitted, the pull-out member 10 is a member that is gripped by the user and pulled rearward when the optical connector 1 is pulled out from a connection object (adapter or the like). The second spring 70 biases the housing 20 toward the front. The second spring 70 has a role of moving the pull-out member 10 that has moved rearward with respect to the housing 20 forward and returning the pull-out member 10 to an original position thereof. The second spring 70 is arranged in the gap formed between the housing 20 and the pull-out member 10.

The housing 20 is formed in a tubular shape extending in the front and rear direction X. As shown in FIG. 2, the housing 20 covers the ferrule 33, the boot 32, the spacer 40, the spring 50, a front end portion of the support portion 60, and the like. A lock portion 22 is formed at each of both ends of the housing 20 in the left and right direction Y. The lock portion 22 is a portion in which a claw portion included in the object to be connected is locked when the optical connector 1 is connected to the object to be connected. At least a portion of the lock portion 22 is covered with the pulling member 10. When the pull-out member 10 moves rearward with respect to the housing 20, the lock portion 22 is exposed and the claw portion of the object to be connected is released from the lock portion 22.

Figure 3:
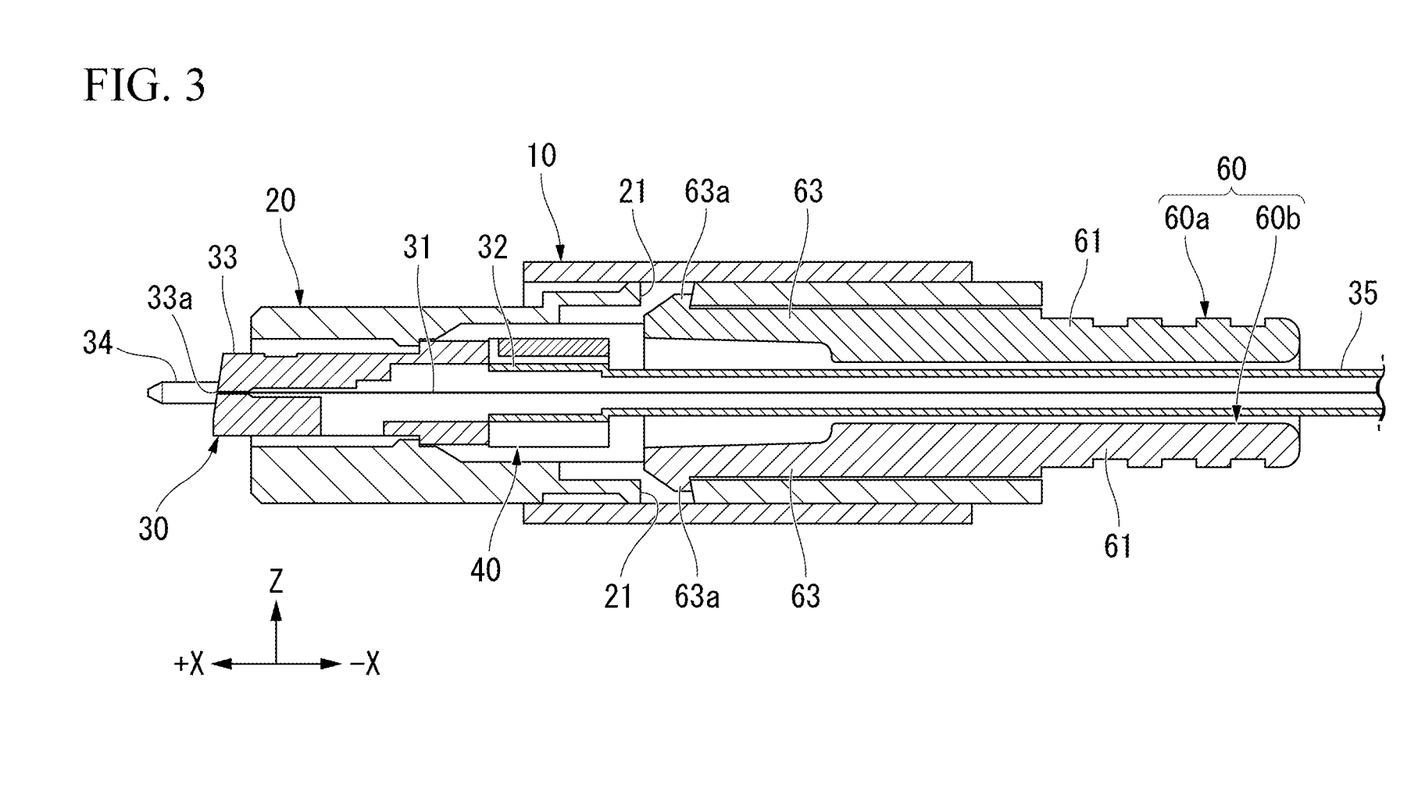
FIG. 3 is a cross-sectional arrow view taken along the III-III line in FIG. 1.

As shown in FIG. 3, the housing 20 is formed with two lock holes 21. The two lock holes 21 are arranged side by side in the vertical direction Z, and penetrate the housing 20 in the vertical direction Z. Although not shown, the two lock holes 21 are located at a center portion of the housing 20 in the left and right direction Y.

Figure 4:
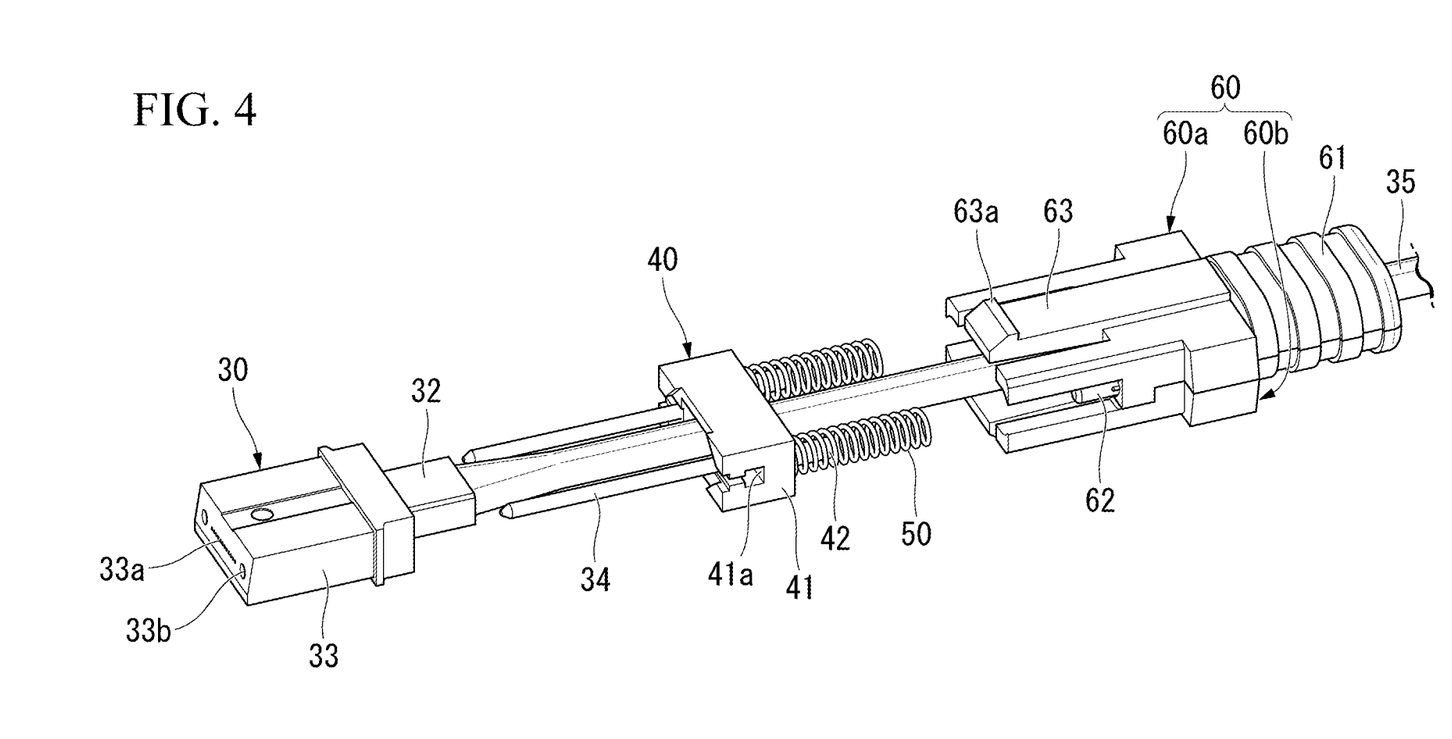
FIG. 4 is an exploded perspective view of the optical connector of FIG. 1.

The optical fiber 31, the boot 32, the ferrule 33, and the tube 35 constitute the ferrule unit 30. The constituent members of the ferrule unit 30 are fixed to each other by an adhesive such as resin. When manufacturing the optical connector 1, as shown in FIG. 4, the spacer 40, the spring 50, the support portion 60, and the like are assembled to the ferrule unit 30 from the rear.

As shown in FIG. 2, the front end of the ferrule 33 protrudes forward from the housing 20. The front end of the optical fiber 31 is located near the front end surface of the ferrule 33. Two positioning holes 33b are formed in the ferrule 33. The two positioning holes 33b penetrate the ferrule 33 in the front and rear direction X, and are arranged so as to sandwich the plurality of insertion holes 33a in the left and right direction Y. In one or more embodiments, a pin 34 is inserted through each of the positioning holes 33b. The pin 34 is used to align the position of the optical connector 1 with the other optical connector by being inserted into the positioning hole of the other optical connector. When the other optical connector has a pin, the optical connector 1 does not have to have the pin 34.

Boots 32 are fixed to the rear end of the ferrule 33. The rear end of the ferrule 33 and the front end of the boot 32 may be filled with a fixing resin. The tube 35 extends rearward from the boot 32. The tube 35 is inserted through the support portion 60 and extends rearward from the support portion 60.

The spacer 40 is located behind the ferrule 33. The spacer 40 is arranged between the spring 50 and the ferrule 33, and transmits the forward biasing force of the spring 50 to the ferrule 33. Therefore, the spacer 40 is in contact with the rear end surface of the ferrule 33. As shown in FIG. 4, the spacer 40 has a spacer main body portion 41 and two second positioning portions 42. The spacer main body 41 is formed in a substantially rectangular parallelepiped shape. Two grooves 41a are formed in the spacer main body 41. The grooves 41a extend inward in the left and right direction Y from both end surfaces of the spacer main body 41 in the left and right direction Y. The rear end of the pin 34 is housed inside the groove 41a. As described above, the spacer 40 also has a role of holding the pin 34.

The two second positioning portions 42 protrude rearward from the spacer main body portion 41. The two second positioning portions 42 are arranged at intervals in the left and right direction Y. The second positioning portion 42 is used to determine the position of the front end portion of the spring 50. In one or more embodiments, the spring 50 is fitted onto the columnar second positioning portion 42 from the rear. However, the second positioning portion 42 may be a circular recess, and the spring 50 may be inserted into the recess from the rear.

An opening (not shown) having a size through which the tube 35 can pass is formed on a lower surface of the spacer main body 41. Therefore, when assembling the optical connector 1, the tube 35 can be accommodated inside the spacer main body portion 41 through the opening of the spacer body portion 41. In addition, when the optical connector 1 is disassembled, the tube 35 can be taken out from the spacer main body 41 by moving the tube 35 downward with respect to the spacer 40.

As shown in FIG. 2, the two springs 50 are arranged so as to sandwich the tube 35 and the optical fiber 31 in the left and right direction Y. The spring 50 is a compression spring that is circular when viewed from the front and rear direction X. In one or more embodiments, as described later, the two latch portions 63 are arranged side by side in the vertical direction Z instead of the left and right direction Y, so that a space in the housing 20 in the left and right direction Y is secured. Therefore, when viewed from the front and rear direction X, for example, the spring characteristics can be easily satisfied even if the spring 50 does not have an elliptical shape which is long in the vertical direction Z. The spring 50 may have an elliptical shape when viewed from the front and rear direction X, depending on the required spring characteristics.

Figure 5:
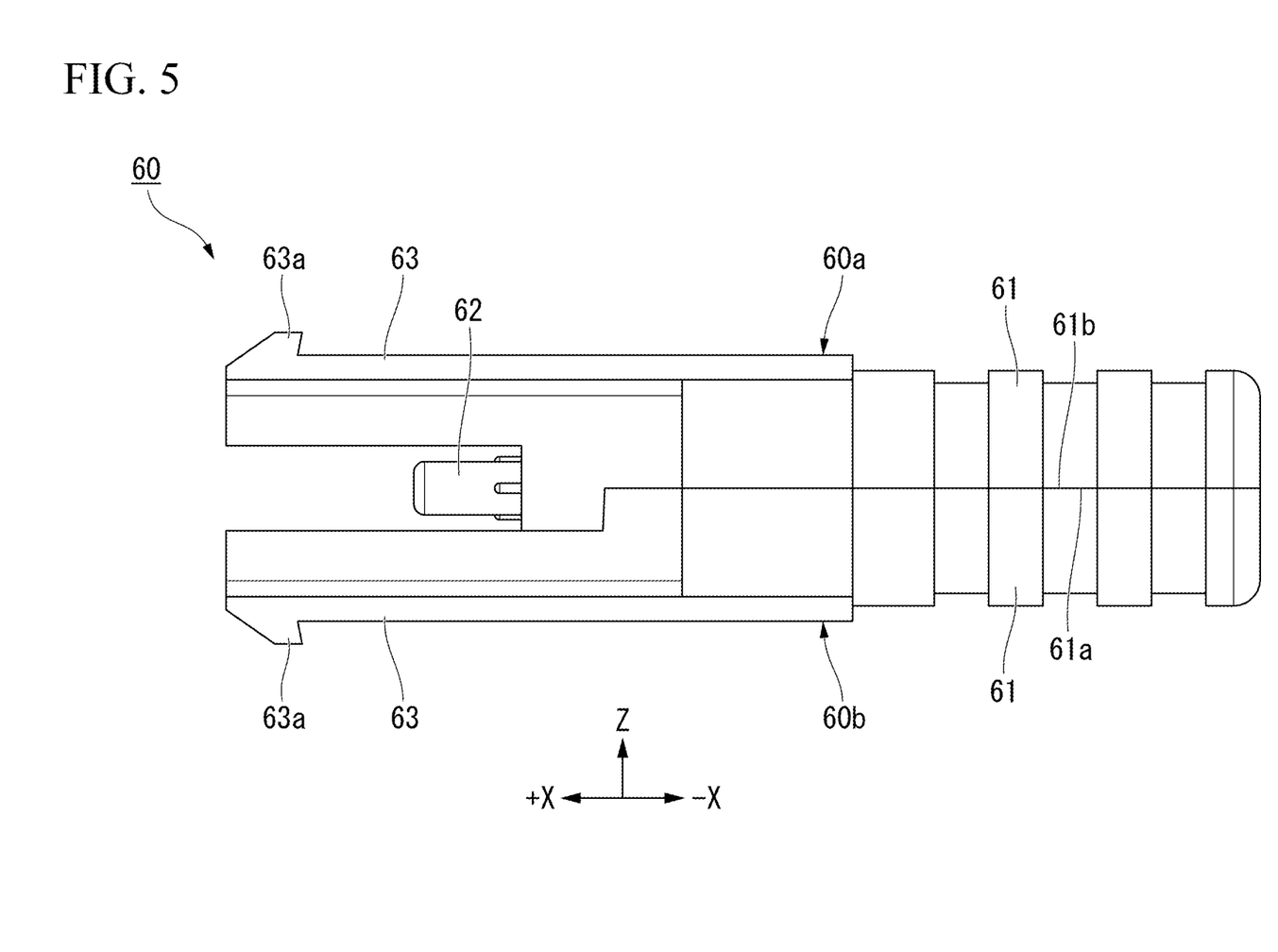
FIG. 5 is a view of a support portion of FIG. 4 viewed from the left and right direction.
Figure 6:
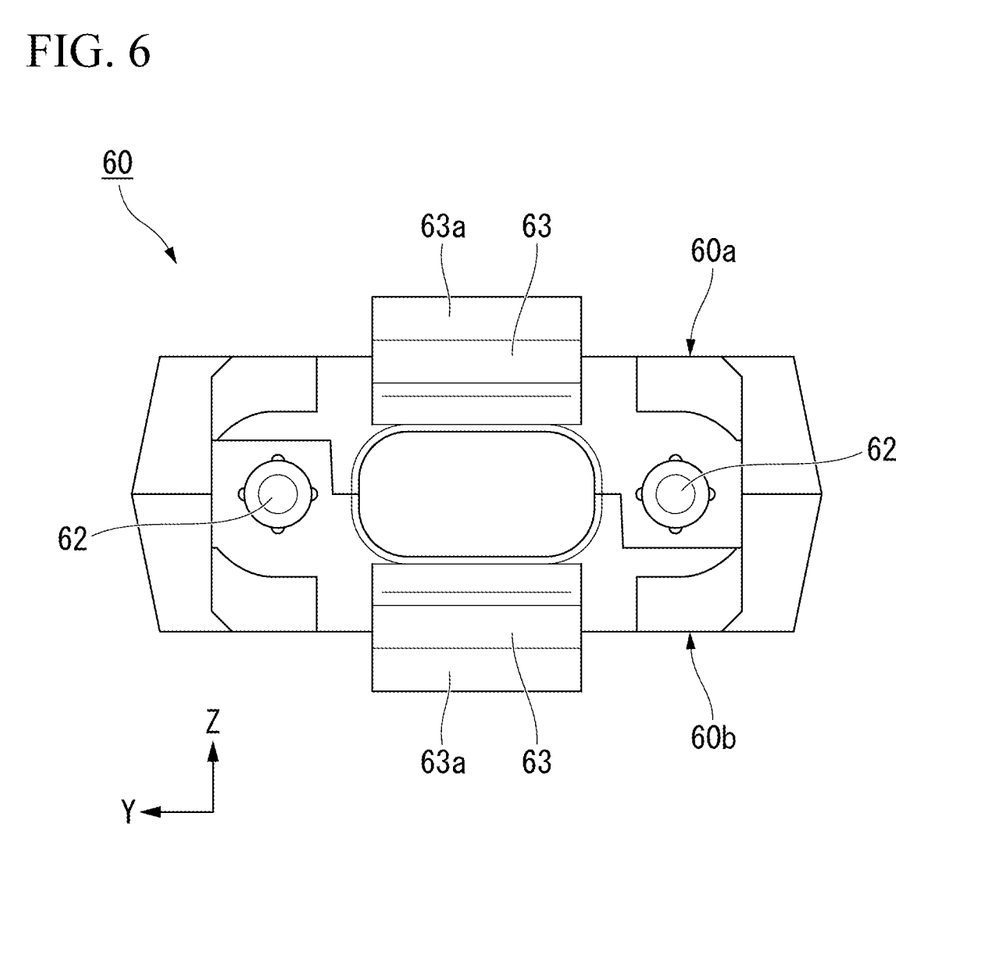
FIG. 6 is a view of a support portion of FIG. 4 viewed from the front.
Figure 7:
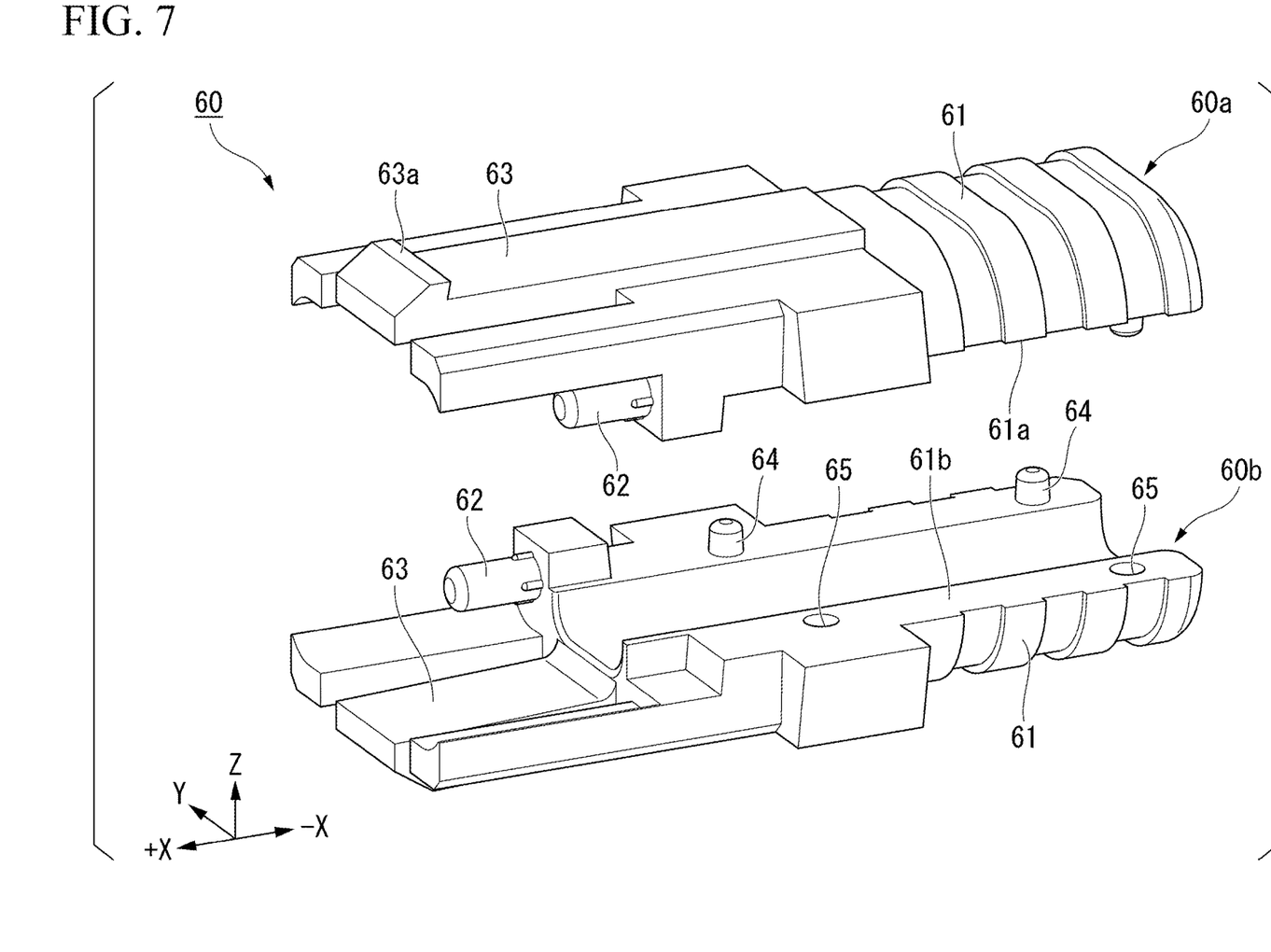
FIG. 7 is an exploded diagram of the support portion of FIG. 4 in the first divided member and the second divided member.

The support portion 60 is located rearward of the spring 50 and supports the spring 50 from the rear. The support portion 60 of one or more embodiments is configured by combining the first divided member 60a and the second divided member 60b. As shown in FIGS. 5, 6 and 7, the first divided member 60a and the second divided member 60b are formed to have a similar shape.

The first divided member 60a and the second divided member 60b each has a semi-cylindrical portion 61, a positioning portion 62, and a latch portion 63.

The semi-cylindrical portion 61 is formed in a semi-cylindrical shape extending in the front and rear direction X. The tubular portion is configured by combining the two semi-cylindrical portions 61 of the first divided member 60a and the second divided member 60b. The tube 35 is inserted inside the tubular portion. The tubular portion is a portion that the user grips when connecting the optical connector 1 to the object to be connected. Therefore, the outer peripheral surface of the tubular portion (the outer peripheral surface of the semi-cylindrical portion 61) is formed with an uneven shape to prevent slipping.

As shown in FIGS. 5 and 7, the semi-cylindrical portion 61 of the first divided member 60a has a first contact surface 61a, and the semi-cylindrical portion 61 of the second divided member 60b has a second contact surface 61b. When the two semi-cylindrical portions 61 are combined, the first contact surface 61a and the second contact surface 61b come into contact with each other. The first contact surface 61a faces downward, and the second contact surface 61b faces upward. Thus, the first contact surface 61a and the second contact surface 61b face toward the vertical direction Z. As shown in FIG. 7, the semi-cylindrical portion 61 is formed with two convex portions 64 and two concave portions 65. Each recess 65 is recessed from the first contact surface 61a or the second contact surface 61b, and the respective convex portions 64 protrude from the first contact surface 61a or second contact surface 61b. In the first divided member 60a and the second divided member 60b, the first divided member 60a and the second divided member 60b are fixed to each other by fitting one of the convex portions 64 into the other recess 65.

The positioning portion 62 and the latch portion 63 protrude forward from the semi-cylindrical portion 61. The positioning portion 62 is formed in a columnar shape extending in the front and rear direction X. The rear end portion of the spring 50 is fitted onto the positioning portion 62. In such a manner, the positioning portion 62 of the support portion 60 and the second positioning portion 42 of the spacer 40 determine the positions of the front end portion and the rear end portion of the spring 50 (see FIG. 2). The positioning portion 62 may be a circular recess, and the spring 50 may be inserted into the recess from the front.

As shown in FIG. 7, the latch portion 63 is formed in a plate shape extending along the front and rear direction X and the left and right direction Y. When viewed from the vertical direction Z, the latch portion 63 has a rectangular shape in which the dimension in the front and rear direction X is larger than the dimension in the left and right direction Y. The latch portion 63 is elastically deformable in the vertical direction Z with the rear end portion as the base end.

A lock claw 63a is formed at the front end portion of the latch portion 63. The lock claw 63a protrudes outward from the latch portion 63 in the vertical direction Z. That is, the lock claw 63a of the latch portion 63 located above protrudes upward, and the lock claw 63a of the latch portion 63 located below protrudes downward. As shown in FIG. 3, the lock claw 63a is locked in the lock hole 21 of the housing 20 to restrict the rearward movement of the support portion 60 with respect to the housing 20.

Since the first divided member 60a and the second divided member 60b each has a positioning portion 62 and a latch portion 63, the support portion 60 has a total of two positioning portions 62 and two latch portions 63.

As shown in FIG. 6, the two positioning portions 62 are arranged at intervals in the left and right direction Y. The two latch portions 63 are arranged at intervals in the vertical direction Z. As shown in FIG. 2, the optical fiber 31 is arranged between the two positioning portions 62. In addition, as shown in FIG. 3, the optical fiber 31 is arranged between the two latch portions 63.

When assembling the optical connector 1, the ferrule unit 30 is inserted into the support portion 60 in advance, and in this state, the support portion 60 is pushed into the housing 20 from the rear. At this time, the latch portion 63 bends inward in the vertical direction Z with the rear end portion as a base end. For example, the upper latch portion 63 bends downward, and the lower latch portion 63 bends upward. Then, when the lock claw 63a reaches the lock hole 21, the latch portion 63 is displaced outward in the vertical direction Z and returns to the original position.

Here, assuming that the two latch portions 63 are arranged side by side in the left and right direction Y, when the latch portion 63 is locked in the lock hole 21, the latch portion 63 bends inward in the left and right direction Y. In this case, when the latch portion 63 pushes the spring 50 inward in the left and right direction Y, the spring 50 is pressed against the tube 35, and a local stress may be applied to the optical fiber 31 in the tube 35. When a local stress is applied to the optical fiber 31, transmission loss may increase or the optical fiber 31 may be disconnected.

In addition, the same phenomenon can occur not only when the optical connector 1 is assembled but also when the optical connector 1 is disassembled. That is, in order to release the lock of the latch portion 63 with respect to the lock hole 21, the user may push the lock claw 63a toward the inside of the housing 20. Also at this time, the latch portion 63 bends toward the optical fiber 31, so that a local stress may be applied to the optical fiber 31.

On the other hand, in one or more embodiments, the two latch portions 63 are arranged side by side in the vertical direction Z, and the spring 50 is not arranged between the latch portion 63 and the optical fiber 31. Therefore, it is possible to avoid applying local stress to the optical fiber 31 by pushing the spring 50 by the latch portion 63 when assembling or disassembling the optical connector 1.

The number of the latch portion 63 and the lock holes 21 may be changed. For example, two lock holes 21 may be formed on the upper end surface of the housing 20 and two lock holes 21 may be formed on the lower end surface of the housing 20. Then, the support portion 60 may have four latch portions 63 so as to lock each of these four lock holes 21 in total.

As described above, the optical connector 1 of one or more embodiments includes the optical fiber 31, the ferrule 33 having an insertion hole 33a through which the optical fiber 31 is inserted, the housing 20 accommodating the ferrule 33, two springs 50 arranged so as to sandwich the optical fiber 31 and biasing the ferrule 33 forward, and the support portion 60 supporting the two springs 50 from the rear. The support portion 60 is configured by combining the first divided member 60a and the second divided member 60b, and includes at least two latch portions 63 each locked in at least two lock holes 21 formed in the housing 20. When the direction in which the insertion hole 33a extends is the front and rear direction X, the direction in which the two springs 50 are arranged side by side is the left and right direction Y, and the direction orthogonal to both the front and rear direction X and the left and right direction Y is the vertical direction Z, two latch portions 63 are arranged side by side in the vertical direction Z. In addition, the two latch portions 63 are configured to bend in the vertical direction Z when locked in the two lock holes 21.

Thus, two latch portions 63 locking the support portion 60 to the housing 20 are configured to be arranged in the vertical direction Z which is orthogonal to the left and right direction Y where the two springs 50 are arranged side by side, and are configured to bend in the vertical direction Z. Therefore, even when the two latch portions 63 are pushed toward the inside of the housing 20 during manufacturing or using the optical connector 1, the spring 50 is suppressed from being pushed by the latch portion 63 to fall toward the optical fiber 31. Therefore, it is possible to suppress the application of local stress to the optical fiber 31.

In addition, two springs 50 biasing the ferrule 33 forward are arranged so as to sandwich the optical fiber 31 in between. Therefore, as compared with the case where the optical fiber 31 is inserted inside one spring 50, for example, the optical connector 1 can be easily disassembled and the optical fiber 31 (ferrule unit 30) can be easily taken out. Therefore, depending on the shape of the object to be connected, the usage in the state of the optical connector 1 or in the state of the ferrule unit 30 becomes easy.

In addition, by releasing the fitting between the convex portion 64 and the concave portion 65, the support portion 60 can be disassembled into the states of the divided members 60a and 60b, and the support portion 60 can be easily removed from the ferrule unit 30.

In addition, in one or more embodiments, the boundary between the first divided member 60a and the second divided member 60b is located at a portion other than (e.g., disposed apart from) the two latch portions 63. Therefore, for example, the strength and the forming accuracy of the latch portion 63 can be increased as compared with the case where the latch portion 63 is formed by combining the first divided member 60a and the second divided member 60b.

In addition, the support portion 60 has two positioning portions 62 that each determines the positions of each of the two springs 50, and the boundary between the first divided member 60a and the second divided member 60b is located in the portion except the two positioning portions 62 (e.g., disposed apart from the two positioning portions 62). Therefore, for example, the strength and the forming accuracy of the positioning portion 62 can be increased as compared with the case where the positioning portion 62 is formed by combining the first divided member 60a and the second divided member 60b.

In addition, since the first divided member 60a and the second divided member 60b have the same shape as each other, these divided members 60a and 60b can be molded by a common mold or the like. Therefore, it is possible to reduce the cost.

In addition, for example, when a user or the like grips the support portion 60, a large external force may be applied to the support portion 60, and the first divided member 60a and the second divided member 60b may move so as to be separated from each other. In such a case, the first divided member 60a of the first contact surface 61a and the second divided member 60b of the second contact surface 61b also face the vertical direction Z, and therefore, the spring 50 is suppressed from being pressed against the optical fiber 31.

The technical scope of the present invention is not limited to the above-described embodiments, and various modifications can be made without departing from the spirit of the present invention.

For example, the latch portion 63 or the positioning portion 62 may position the boundary between the first divided member 60a and the second divided member 60b.

In addition, the first divided member 60a and the second divided member 60b may be formed in different shapes.

In addition, it is possible to replace the components in the above-described embodiments with well-known components as appropriate without departing from the spirit of the present invention, and the above-described embodiments and modifications may be appropriately combined.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims

DESCRIPTION OF THE REFERENCE SYMBOLS

1: Optical connector
20: Housing
21: Lock hole
31: Optical fiber
33: Ferrule
33a: Insertion hole
50: Spring
60: Support
60a: First divided member
60b: Second divided member
61a: First contact surface
61b: Second contact surface
62: Positioning portion
63: Latch portion
X: Front and rear direction
Y: Left and right direction
Z: Vertical direction

The invention claimed is:

1. An optical connector, comprising:
an optical fiber;
a ferrule with an insertion hole that accommodates the optical fiber;
a housing that accommodates the ferrule and that includes two lock holes formed therein;
two springs that sandwich the optical fiber therebetween, and that bias the ferrule in a forward direction of the optical connector; and
a support portion that supports the two springs from a rear direction of the optical connector, wherein
the support portion comprises:
a first divided member;
a second divided member that is combined with the first divided member; and
two latch portions locked in the two lock holes, and
when the insertion hole extends in the forward and the rear directions, the two springs are disposed along left and right directions of the optical connector, and a vertical direction is orthogonal to the front, rear, right, and left directions, the two latch portions are disposed side by side in the vertical direction and are configured to bend in the vertical direction when locked in the two lock holes.

2. The optical connector according to claim 1, wherein a boundary between the first divided member and the second divided member is disposed apart from the two latch portions.

3. The optical connector according to claim 1, wherein the support portion has two positioning portions that each determine the positions of each of the two springs; and
a boundary between the first divided member and the second divided member is disposed apart from the two positioning portions.

4. The optical connector according to claim 1, wherein the first divided member and the second divided member have the same shape.

5. The optical connector according to claim 1, wherein the first divided member comprises a first contact surfaces;
the second divided member comprises a second contact surface that contacts the first contact surface, and
the first contact surface and the second contact surface face the vertical direction.

* * * * *

UNITED STATES PATENT AND TRADEMARK OFFICE
CERTIFICATE OF CORRECTION

| | | |
|---|---|---|
| PATENT NO. | : 12,013,575 B2 | Page 1 of 1 |
| APPLICATION NO. | : 17/615818 | |
| DATED | : June 18, 2024 | |
| INVENTOR(S) | : Tomoyuki Shinoda et al. | |

It is certified that error appears in the above-identified patent and that said Letters Patent is hereby corrected as shown below:

In the Claims

At Column 8, Claim number 5, Line number 60-61:
"contact surfaces;" should read -- contact surface, --.

Signed and Sealed this
Twenty-second Day of October, 2024

Katherine Kelly Vidal
*Director of the United States Patent and Trademark Office*